3,536,782
HALOGENATED POLYESTER COMPOSITIONS AND PROCESS FOR PREPARING THE SAME
Ulrich Toggweiler and Frank F. Roselli, Redwood City, Calif., assignors to Diamond Shamrock Corporation, a corporation of Delaware
No Drawing. Filed Jan. 25, 1967, Ser. No. 611,574
Int. Cl. C08f *21/02;* C08g *17/12*
U.S. Cl. 260—869                                                    11 Claims

ABSTRACT OF THE DISCLOSURE

Halogenated polyester containing compositions having a high degree of flame resistance are prepared by a method of post halogenation wherein a base polyester containing non-alpha, beta ethylenic unsaturation other than aromatic unsaturation is first prepared and then halogenated, thus eliminating the common use of halogenated intermediate raw materials. The halogenated polyesters may be used directly, such as in coating compositions or may be reacted with isocyanate containing compounds to form halogenated polyurethane compositions. When the halogenated polyesters also contain alpha beta ethylenic unsaturation as derived from alpha, beta unsaturated polycarboxylic acids and anhydrides, they may be cross-linked and cured in the conventional manner with vinyl substituted monomers. The halogen containing compositions prepared by this process exhibit superior flame retardancy, color characteristics and physical properties than halogenated polyester containing compositions prepared by reacting halogen containing constituents.

BACKGROUND OF THE INVENTION

Polyester resin compositions have achieved wide commercial utility in that they can be cured alone at low to moderate temperatures or with various reinforcing materials, such as synthetic and natural reinforcing fibers and strands, e.g., glass fibers, nylon, cotton, sisal, asbestos as well as many other materials in the form of fabric, mat, yarn and the like to give hard, durable, light weight structural materials. Such polyesters also can be applied to surfaces by spraying roller coating, dipping, brushing or other suitable means to give tough, weather resistant thermoset coatings. The high strength properties of these compositions combined with their light weight and durability make them successful competitors for many applications with more conventional structural materials. Further, polyesters can also be used in the preparation of urethane polymers which can be employed as coatings or in the form of foam for use as insulation material.

In spite of the excellent physical properties of such polyester-based compositions, they possess a major disadvantage in that they are flammable, thereby limiting the areas of potential use. Several approaches have heretofore been suggested to improve the flame resistance of polyester compositions and such methods generally involve incorporating a flame-resistant material or element into the polyester composition, either as a reactive or non-reactive additive or as an integral part of one of the basic raw materials.

An effective, generally economical, and widely accepted approach involves incorporating fire retardant fillers or additives into the composition, usually just prior to the final polymerization step. These fillers or additives generally include materials such as borates, silicates, antimony oxides, phosphates, phosphites and derivatives thereof. However, when a filler-type component is added it has been found that the filler may separate or precipitate during the subsequent curing process, producing variable fire retardancy, color and light transmitting properties in the cured resin. Further, transparent cured articles usually cannot be produced using fillers because of their opaque properties. In addition such fillers tend to result in reduced physical strength and hardness of the polyester composition. Filler-type materials may tend to migrate to the surface of the resin and undergo hydrolysis when they come in contact with moist air resulting in surface degradation.

Reactive additive type compounds become part of the cured resin and therefore cannot migrate or be extracted by water; however, they still may have a deleterious effect on the physical properties of the polyester composition. It has been found that some of the more readily available fire-retardant compounds which are useful for this purpose are sufficiently stable under mild exposure conditions, but break down upon exposure to weathering or moderate temperature cycling, thereby causing the polyester composition to lose whatever flame resistance it might have had originally. Thus, the costly step of incorporating such components either of the filler- or additive-type in the polyester composition may be undertaken without the realization of any permanent benefit.

Many methods have been proposed to overcome the shortcomings of the filler and additive type fire proofing components by using halogenated raw materials in the polyester composition, that is, react either a halogenated polycarboxylic acid and/or halogenated polyhydric alcohol to obtain a halogen containing fire retardant polyester composition. For instance, polyester compositions previously have been prepared by reacting halogenated materials, such as tetrabromophthalic anhydride, 2,3-dihalo succinic acid, polyhalogenous epoxides, and 1,4,5,6, 7,7-hexachlorobicyclo(2.2.1)-5-heptane-2,3 - dicarboxylic anhydride (more commonly known as chlorendic anhydride) with various glycols, saturated and unsaturated polycarboxylic acids and anhydrides to produce polyesters of varying degrees of flame retardancy. Even though such modified polyesters represent an improvement in the art they do exhibit certain undesirable properties.

When employing such halogenated raw materials, particularly bromine containing components, in the preparation of polyester resins, it has generally been found that the temperatures required for polyesterification are higher than the degradation temperature of the halogenated component. Thus, during the polyesterification reaction there is a tendency towards elimination of halogen through dehydrohalogenation. The contamination of the polyester reaction by this release of hydrogen halide causes the following deleterious side effects: (a) product color is degraded; (b) polymer chain scission occurs making it impossible to achieve the desired high molecular weights; (c) attack on unreacted glycols by hydrogen halide causes cyclic etherification of the glycols, thus not only wasting costly raw materials but generating undesirable compounds; and (d) the presence of hydrogen halide in the final mixture of polyester base with ethylenically unsaturated monomers interferes with the subsequent free radical initiated cross-linking reactions resulting in undercured products of inferior properties. Such problems can be reduced somewhat by the use of esterification catalysts and long low temperature processing cycles for the esterification reaction. However, long processing cycles are costly and additives may themselves produce further undesirable side reactions such as introducing a permanent cloudiness into the product.

A further problem with utilization of known halogen-containing reactive components, particularly chlorinated compounds, in preparation of fire retardant polyesters lies in the difficulty of getting enough chlorine into the polyester to meet the more stringent fire retardant requirements. For instance, commercially available chlorine containing components suitable for polyester manufacture rarely exceed approximately 55% chlorine. At that chlorine level it is difficult, if not impossible, to attain a level of chlorine in the final monomer solution of chlorinated base polyester to meet many of the more rigid fire retardant requirements without resorting either to additives having the aforementioned drawbacks or to use of hard to handle high concentration, high viscosity resin solutions.

SUMMARY OF THE INVENTION

It is, therefore, an object of this invention to provide novel halogenated fire retardant polyester compositions in which the requirement for preparation and/or use of expensive halogenated intermediates is eliminated.

A further object is to provide means of preparing, through a novel process, halogenated fire retardant polyester resins having improved color and fire retardant properties.

It has now been discovered that polyester resins can be halogenated directly, i.e., after the polyesterification reaction has taken place. In this manner the color degrading step and also the necessity of preparing or utilizing an expensive halogenated intermediate can be bypassed completely by first preparing polyester from readily available inexpensive raw materials by conventional means in conventional equipment and then halogenating the polyester at temperatures much below the degradation temperature.

The halogenated polyester base, depending on formulation and intended end use, may then be dissolved in a variety of ethylenically unsaturated monomers. These mixtures may be cross-linked by well known free radical mechanisms with conventional peroxide catalysts, promoters, accelerators, etc., to prepare a large variety of cured articles having excellent color, desirable physical characteristics, and highly fire retardant properties. Carboxyl rich post-halogenated polyesters may be formulated by well known techniques into "water soluble" coatings, binders, and the like.

Alternatively, hydroxyl rich polyester bases halogenated by the process of this invention may be formulated with various polyisocyanates to prepare fire retardant polyurethane and polyurea foams, coatings, and the like.

The polyester base resin composition which is to be halogenated may vary in composition depending upon whether the polyester base resin is to be used in the preparation of a cross-linked polyester or a urethane polymer. Generally, the polyester base resin is prepared by reacting an organic dicarboxylic acid, acid anhydride or mixtures thereof (hereinafter referred to as "dicarboxylic acid compound") with one or more polyhydric alcohols. In the preparation of cross-linked polyesters it is necessary in order to effect subsequent cross-linking that the polyester base resin contain an ethylenic unsaturation other than aromatic unsaturation to provide polymerization sites for cross-linking with the cross-linking agent. Thus, when the polyester base resin is to be used for preparing cross-linked polyesters, it is necessary that the polyester base resin contain at least one alpha, beta-ethylenically unsaturated dibasic acid or anhydride thereof in order for the polyester to react subsequently with the cross-linking agent to form tough infusible polymers.

Urethane polymers are prepared by reacting a compound containing at least two active hydrogen atoms per molecule with a polyisocyanate. The two active hydrogen atoms per molecule generally are provided by hydroxyl groups. Thus, if the polyester is to be used in the preparation of urethane polymers, the polyhydric alcohol is used in excess of the dicarboxylic acid to ensure that a sufficient number of reactive sites are available for subsequent reaction with the polyisocyanate. Since the principal reaction in preparing urethane polymers is between the hydroxyl groups of the polyester and the isocyanate groups of the polyisocyanate, there is no need to have present in the polyester base resin alpha, beta-ethylenic unsaturation which is capable of subsequent vinyl copolymerization. However, since the polyester base resins of this invention are to be halogenated prior to either cross-linking with a copolymerizable monomer or reaction with a polyisocyanate to form a urethane polymer said polyester must be readily susceptible to partial halogenation to provide a polyester base resin after halogenation with a halogen content ranging from about 10% up to about 60%, by weight, preferably about 20% up to about 40%, by weight halogen based on the weight of the polyester base resin without affecting the active sites of the polyester base resin, i.e., either alpha,beta-ethylenic unsaturation necessary for subsequent cross-linking with a cross-linking agent or the active hydrogen atoms on the hydroxyl groups which react with the isocyanate groups of the polyisocyanate.

An unexpected discovery of the present invention is the finding that when halogenating a polyester base resin composition prepared from a dicarboxylic acid compound comprising a mixture of an alpha,beta-ethylenically unsaturated dicarboxylic acid or acid anhydride thereof and an ethylenically unsaturated dicarboxylic acid or anhydride thereof free of any alpha,beta-ethylenic unsaturation, other than aromatic unsaturation, that the halogen preferentially adds to the non-alpha,beta-ethylenic unsaturation prior to adding to the alpha,beta-unsaturation linkage, thereby leaving these latter potential polymerization sites available for subsequent polymerization with the cross-linking agent. Thus, the amount of halogen which is desired to be added is controlled by the amount of non-alpha,beta-ethylenic unsaturation present, other than aromatic unsaturation.

Specifically, it has been unexpectedly found that a polyester base resin prepared by reacting a polyhydric alcohol with a mixture of ethylenically unsaturated dicarboxylic acids or acid anhydrides thereof containing alpha,beta-ethylenic unsaturation, for instance maleic acid, with a non-alpha,beta-ethylenically unsaturated dicarboxylic acid or acid anhydride thereof, such as tetrahydrophthalic acid, may be halogenated, so that the halogen addition to the polyester base resin is preferential to the non-alpha,beta-ethylenically unsaturated acid, to almost the total exclusion of halogen addition to the alpha-beta-ethylenically unsaturated acid. The preferential addition of halogen to the non-alpha,beta-ethylenically unsaturated dibasic acids to that of alpha-beta-ethylenically unsaturated acids is not fully understood, but it is believed that the proximity of the carboxy groups to the ethylenic unsaturation hinders the addition of a halogen atom to the alpha,beta-ethylenic unsaturated bond, whereas the halogenation of the dicarboxylic acids having non-alpha,beta-ethylenic unsaturation proceeds at a much faster rate. For instance, it has been found that a polyester prepared by reacting ethylene glycol, tetrahydrophthalic acid and maleic acid is halogenated preferentially through the addition of the halogen atoms to the unsaturated bonds of the tetrahydrophthalic acid moiety at a rate of approximately ten times faster than the rate of halogen addition to the unsaturation bonds of the maleic acid moiety. Accordingly, if the polyester base resin composition is to be used in the preparation of cross-linked polyesters, the dicarboxylic acid compound employed is preferably a mixture of an alpha,beta-ethylenically unsaturated dicarboxy acid or acid anhydride thereof and an ethylenically unsaturated acid or acid anhydride thereof free from alpha,beta-ethylenic unsaturation other than aromatic unsaturation.

DESCRIPTION OF THE PREFERRED EMBODIMENTS

In preparing the halogenated polyester base resin for use in the preparation of either cross-linked polyesters or urethane polymers, non-alpha,beta-unsaturated dicarboxylic acids and acid anhydrides thereof, while being preferred, need not be employed so long as the polyester base resin composition is susceptible to halogenation without deleteriously affecting either the alpha,beta-ethylenic unsaturation required for subsequent cross-linking or the active hydrogen atoms for subsequent reaction with the isocyanate groups of the polyisocyanates in the preparation of the urethane polymers. For instance, the halogen receptive sites may be provided by unsaturated polyhydroxyl compounds or by other means wherein the halogenation rate of said halogen receptive sites is at least several times more rapid than the rate for the alpha,beta-ethylenic unsaturation present.

Alpha,beta-ethylenically unsaturated carboxylic acids and anhydrides thereof suitable for use in preparing the products of this invention are exemplified by maleic, fumaric, itaconic, citraconic, mesaconic and the like containing up to about 20 carbon atoms per molecule. Unsaturated carboxylic acids and anhydrides free from any alpha,beta-ethylenic unsaturation other than aromatic unsaturation which may be present in the polyester as a halogen acceptor are represented by compounds such as endo-bicyclo(2.2.2)octa-5-ene-2,3-dicarboxylic;
tetrahydrophthalic;
endo-cis-bicyclo(2.2.1)-5-heptene-2,3-dicarboxylic;
3,6-endoxo-1,2,3,6-tetrahydrophthalic;
methyl-5-norborene-2,3-dicarboxylic;
1-decenyl succinic;
acetylene dicarboxylic and the like containing up to about 20 carbon atoms per molecule. When the polyesters are prepared for subsequent cross-linking with unsaturated monomers these acids and anhydrides are characterized by having a halogenation rate faster than the alpha,beta-ethylenically unsaturated compounds employed.

Also, other dicarboxylic acids and anhydrides may be employed to modify the physical properties of the final polyester product, provided such compounds do not participate in either the halogenation or subsequent cross-linking reactions. Such materials are saturated or contain aromatic unsaturation but are free from any ethylenic aliphatic unsaturation and are not susceptible to halogenation under the conditions employed. These acids and anhydrides may be substituted with halogen, if desired. Typical of this group of modifying acids and anhydrides are: orthophthalic, isophthalic, terephthalic, adipic, azelaic, diglycolic, trimellitic, pyromellitic, diphenic, cyclohexane dicarboxylic, dichlorosuccinic, tetrachlorophthalic, glutaric, naphthalic and the like containing up to about 20 carbon atoms per molecule.

A wide variety of polyhydroxy compounds are suitable for preparing the base polyesters and may either by saturated or may contain active unsaturation which may be susceptible to subsequent halogenation thus providing additional means of increasing the halogen content of the final product. It is preferable that such unsaturation, however, be either relatively immune to halogenation, i.e., aromatic, or in the case of polyesters intended for subsequent vinyl cross-linking, be readily halogenated, i.e., have a halogenation rate at least faster than the halogenation rate of the alpha,beta-ethylenically unsaturated dicarboxylic acid compound. The polyols which may be employed generally contain from about 2 to 24 carbon atoms. Specific polyols are illustrated by the following: ethylene glycol, diethylene glycol, propylene glycol, butane diol, butene diol, hexane diol, hexene diol, butyne diol, cyclohexane diol, cyclohexene diol, neopentyl glycol, hydrogenated bisphenol A, adducts of cyclopentadiene and unsaturated polyhydroxy compounds, polyethylene glycol, 2,2,4-trimethyl-1,3-pentane diol, cyclohexane dimethanol, trimethylol ethane, trimethylol propane, pentaerythritol, dichlorobutane diol, 3-chloro-1,2-propane diol, alkylene oxide adducts of various bisphenols, allyl ethers of polyhydroxyl compounds, such as glyceryl alpha allyl ether, diallyl ether of pentaerythritol, allyl ethers of trimethylol pentane. If the polyester base resin composition is to be used in the preparation of urethane polymer, at least one of the reactants must contain active unsaturation. Accordingly, polyhydroxy compounds containing active unsaturation, such as the foregoing ethylenically unsaturated polyhydric alcohols, may be reacted with dicarboxylic acids and anhydrides which are saturated or contain aromatic unsaturation but are free of any ethylenic unsaturation as previously mentioned.

In preparing the polyester base resin composition which is to be used either in the preparation of a cross-linked polyester of the preparation of urethane polymer, typical esterification reaction conditions may be employed, the only variation being the concentrations of the dicarboxylic acid compound and polyhydric alcohol employed. When the polyester base resin composition is to be used for preparing cross-linked polyesters the polyhydric alcohol is charged to the esterification reaction zone in an amount sufficient to react theoretically with all of the carboxyl groups present in the reaction zone. Generally, however, more than the theoretical amount of the polyhydric alcohol necessary to react with all of the carboxyl groups is employed and the amount of excess alcohol is determined by the reaction conditions, the particular dicarboxylic acid compound charged and the properties desired in the resin product. Usually the amount of polyhydric alcohol is not more than about 125 mol percent, preferably within the range of about 105 to 110 mol percent of the theoretical amount necessary to react with all of the carboxylic groups present therein. It should be mentioned, however, that for certain end uses, such as water soluble binders and coatings, an excess of carboxyl may be employed.

The ratios of the various dicarboxylic acids or anhydrides to be used may vary widely according to the properites desired in the final cross-linked product. Amounts of the non-alpha,beta-ethylenically unsaturated component should be sufficient to result in a halogenated polyester base having a halogen content of between about 10% and 50%, preferably about 20% to 40% by weight. In addition, there must be present sufficient cross-linking capability in the form of alpha,beta-ethylenic unsaturation to ensure adequate physical properties of the final cross-linked polymer. Thus, the proportion of alpha,beta-ethylenically unsaturated component present in the polyester should be at least about 15 mol percent and preferably in the range of about 33 to 67 mol percent. Too low active unsaturation will result in inadequate cross-link density and heat distortion temperature in the final cured product resulting in impaired fire retardant properties.

In preparing polyester base resin compositions which are to be eventually used in the preparation of urethane polymers, the resulting polyester base resin should contain at least two active hydrogen atoms per molecule and, accordingly, the polyhydric alcohol is used in amounts substantially in excess of that theoretically necessary to react with all of the carboxyl groups present therein. The amount of molar excess of hydroxy to be employed will depend upon the functionality of the polyhydric alcohol, the desired excess hydroxyl equivalency and the intended end use of the specific product. In general, however, the ratio of hydroxyl equivalent employed per carboxyl equivalents employed per carboxyl equivalent will range from about 1.2 to 4.0.

With either type of base resin the polyhydric alcohol is usually charged to the reaction vessel first followed by the polycarboxylic acids or anhydrides. The acids may be added in a single charge or reacted in successive stages to alter the end properties of the polymer if desired. Usually the polyesterification may be accomplished simply by heating the reaction mixture at temperatures of about 150° to 250° C., preferably at approximately 180° to 220° C. With certain difficult to react raw materials it may be practical to add certain known esterification catalysts such as paratoluene sulfonic acid or metalorganic salts, such as dibutyl tin oxide or stannous oxalate, to speed the reaction but this step is usually not necessary. Chain stopping agents are sometimes added in minor proportions to terminate the growth of the polyester chain by introducing terminal hydrocarbon residues. Among such compounds are monohydric alcohols, e.g., butyl, octyl, tetrahydrofurfuryl, dichloro or dibromopropanol and the like or monobasic acids such as propionic, chloroacetic, benzoic, etc. An inert gas such as nitrogen or carbon dioxide is usually passed through the mixture to eliminate side reactions which could lead to gel formation or color degradation. The reaction generally proceeds easily and smoothly and the rate of reaction is primarily governed by the capacity of the equipment selected to remove the water of esterification which results from the direct esterification. The reaction is usually carried out at atmospheric pressure, but vacuum distillation has been found to be an acceptable means of removing the water of esterification.

Completion of the esterification reaction may be observed in a variety of ways well known to those skilled in polyester technology. One such procedure which may be employed is to compare the proportion of water which is removed to the theoretical amount. Other methods frequently employed involve dissolving a cooled sample of the product in a suitable solvent medium such as styrene to observe its degree of polymerization as evidenced by relative viscosity, acid number or melting point and using such data as a guide to indicate the completion of the reaction. Preferably, the polyester base resin composition of the present invention that is to be used in the preparation of cross-linked polyesters is characterized by an acid number of less than 50 (mg. of KOH per g. resin), a molecular weight of greater than 1000 and a color of less than 400 as determined by the method of the American Public Health Association (APHA). Such base resins vary from viscous liquids to brittle solids depending upon the particular raw materials employed.

The polyester base resin composition is then halogenated to obtain a halogenated polyester base resin composition containing approximately 10 to 60%, preferably 20 to 40%, by weight halogen in the polyester base resin composition. Halogenation of the polyester base resin composition generally is achieved employing standard halogenation procedures and reaction conditions. For instance, the polyester base resin composition is first dissolved in a solvent which is not readily susceptible to halogenation, such as for example, the lower molecular weight halogenation saturated hydrocarbons, e.g., methylene chloride, chloroform, chlorofluoromethane, ethylene dichloride, trichloroethane, and the like; carbon disulfide; acetic acid; diethyl ether; and the like. The halogenation reaction can be conducted at temperatures ranging from a low of about −50° up to about 50° C., preferably −25° to 40° C. High temperatures lead to side reactions which impair performance and color of the final product.

As mentioned, the preferred embodiment of the present invention comprises a polyester base resin composition containing, after halogenation, approximately 10 to 60% by weight halogen. The halogen may be added to the solution of polyester base resin composition either as a liquid or gas. For instance, bromine or chlorine may be added to the solution of polyester base resin beneath the surface of the solution either by gravity feed or low pressure blow case. The addition of the halogen is carried out slowly and at moderate temperatures to avoid side reactions. Preferably, the amount of halogen to be added is first determined either by titration or by calculation based on the non-alpha, beta-ethylenic unsaturation, other than aromatic unsaturation, present in the base resin and then the halogen is added to the base resin less approximately 1% to 1.5% in order to avoid end point problems. Since the halogenation of this invention is an addition type reaction producing only traces of hydrogen halide byproducts it is usually not necessary to employ activators or free radical initiators such as peroxides or persulfates. The reaction generally proceeds smoothly and evenly to the end point at atmospheric pressure.

The solvents may be removed either by vacuum distillation, or evaporated at atmospheric pressure with the aid of an inert gas sparge and recovered for reuse. The temperature at which the solvent is removed should not exceed approximately 180° C. in order to prevent decomposition of the halogenated polyester base resin. Accordingly, the solvent should be removed at temperatures of less than 180° C., preferably in the range of approximately 120° to 150° C. The halogenated base resins of this invention range from viscous liquids to brittle solids depending upon initial formulation. These resins have excellent clarity and a color rating below 400 APHA even when bromine is the halogen.

The halogenated base resins may be either stored for future use or formulated by techniques well known to those skilled in the art into fire retardant products suitable for molding, laminating, casting, coating, foam, and other applications. In preparing cross-linked polyesters, the halogenated base resins are mixed with monomers capable of copolymerization with the alpha, alpha-ethylenic unsaturation present in the base resin. This dissolution may be carried out in the cold or the hot base resin available immediately after completion of the solvent stripping step may be added directly to the monomer in a manner similar to common practice in standard polyester production. Suitable cross-linking agents are polymerizable ethylenically unsaturated monomers having the $CH_2=C<$ grouping and are exemplified by styrene, vinyl toluene, alpha-methyl styrene, chlorostyrene, fluorostyrene, trifluoromethylstyrene, divinylbenzene, diallyl phthalate, triallyl isocyanurate, the alkyl acrylates, the lower alkyl and alkenyl esters of maleic and fumaric acid, vinyl pyridine, vinyl pyrollidone, vinyl carbazole, vinyl ethers, vinyl ketones, and the like. Because of its favorable cost, compatability and reactivity as well as excellent physical properties it provides in the final cross-linked polyester product, styrene is the preferred cross-linking agent. The proportion of copolymerization monomer to unsaturated polyester may be varied between approximately 20% to 60%, preferably about 25% to 50%, by weight of the monomer based on the weight of the polyester.

Polymerization inhibitors usually on the order of 0.001% to 0.1% by weight based on the base resin/monomer mixture may be used to prevent premature polymerization or curing of the mixture and to moderate the gel and cure after addition of catalysts. Exemplary of such inhibitors are hydroquinone, benzoquinone, p-(tertiary butyl)-catechol, and the like. Polymerization catalysts also are added to the mixture of unsaturated polyester and cross-linking agent at the time of use to effect polymerization or curing. Usually employed are the free radical-forming catalysts and include peroxides, for example, acetyl, benzoyl and dicumyl peroxide; hydroperoxides such as cumene hydroperoxide; peresters such as tertiary butyl perbenzoate and tertiary butyl-peroctoate; azo compounds such as alpha, alpha'-azo-diisobutyronitrile; ketone peroxides such as methyl ethyl ketone peroxides. Additionally, activators or accelerators such as cobalt, naphthenate, alkyl mercaptans, dialkyl aromatic amines, and the like may be used to promote the cross-linking reactions so that the polymerization or cure can be effected at lower temperatures or shorter reaction times. The polymerization conditions for effecting the cross-linking reaction may be selected from a wide variety of techniques well known in the art. The temperature employed depends on a variety of factors including the type of end product to be made, the boiling point of the cross-linking agent, catalyst activation temperature, and exothermic characteristics of the polymerization mixture.

While the products of this invention have excellent flame retardant properties and good color for most applications minor improvements can be made to meet the most stringent requirements by use of certain additives. These additives are used in such minor proportions so that the physical properties of the cured polymers are not seriously affected. It has been found, for instance, that the addition of small amounts, e.g., 1% to 10%, of certain pentavalent phosphorous compounds to the halogenated base resin monomer mix not only improves color but enhances flame retardance as well. Exemplary of such pentavalent phosphorous compounds which have been found satisfactory include the mono-, di- or tri-alkyl or alkylene phosphates wherein each of the alkyl groups contain from about 1 to about 4 carbon atoms, for instance, methyl-, ethyl-, propyl-, allyl- and butyl-isomers thereof. Certain epoxide compounds, for instance epichloro- or epibromohydrin have also been found to improve color when used in amounts less than 5%, preferably less than 1%.

The resultant halogenated polyesters may be used to manufacture a wide variety of useful end products which are characterized by a high order of non-flammability and weathering resistance. Certain of the formulations also possess excellent chemical resistance while retaining fire retardancy. Examples of flame retardant products which may be manufactured with the halogenated resins of this invention are: translucent building panels; molded trays, baskets, etc.; electrical parts; truck and car bodies, boats, chemical resistant process equipment and many others.

While the preferred aspect of the present invention is preparing halogenated cross-linked polyesters, another utility of the halogenated polyester base resin composition is the preparation of urethane polymers. As mentioned above, the formation of urethane polymers is achieved by reacting a polyisocyanate, usually a diisocyanate of the aromatic type, with a compound containing at least two reactive hydrogen atoms per molecule, generally, the reactive hydrogen being the hydrogen of a hydroxyl group. Polyurethanes are usually prepared in the form of foams because that form has achieved wide commercial acceptance. They may be prepared by reacting the halogenated polyester base resin composition with the polyisocyanate in the presence of water, which reacts with a portion of the isocyanate to form carbon dioxide which in turn acts as a blowing or expanding agent to enable a foamed product to be formed. Alternatively, liquid blowing agents such as the halogen substituted lower molecular weight alkanes, e.g., trichlorofluoromethane, dichlorodifluoromethane, dichlorotetrafluoroethane, trichlorotrifluoroethane and the like, have found wide acceptance and may be employed in amounts ranging from about 2% to 40%, by weight of the total weight of the urethane foaming materials. The halogenated polyester base resin compositions and polyisocyanate are employed in amounts necessary to achieve the desired chain extension, cross-linking network formation and the like. Foams prepared according to the present invention, may have, if desired, residual unreacted hydroxy and/or isocyanate radicals. In general, however, one equivalent of hydroxyl contained in the halogenated polyester base resin composition is used with about one equivalent of the polyisocyante.

The relative rigidity or flexibility of the urethane foams produced may be at least partially controlled by the composition of the halogenated base polyester as well as the type of polyisocyanate employed. Flexibility is controlled by both the chain length and functionality of polyester reactants and the amount of excess hydroxyl employed. For instance, relatively more flexible foams are obtained when employing long chain diols in the base polyester formula prior to halogenation, with the more rigid types resulting from use of the more highly functional shorter chain triols and tetraols.

The polyisocyanates which may be employed have two or more reactive isocyanate groups as exemplified by hexamethylene diisocyanate, tolylene-2,4-diisocyanate, tolylene-2,6-diisocyanate, diphenylmethane diisocyanate, p,p'-meta-phenylene diisocyanate, polymethylene phenylene polyisocyanates, bis(toluene)-diisocyanate, the naphthylene triisocyanates, and mixtures thereof.

In formulating the halogenated polyester base resins into foaming compositions because of their highly viscous nature it is generally preferred to use the prepolymer technique wherein the halogenated base resin is reacted under controlled conditions with an excess of polyisocyanate to form relatively low viscosity isocyanate rich prepolymer. To form the final foam the prepolymer is then mixed with an additional amount of the halogenated base. Because of the usually highly viscous or semisolid characteristics of the polyester base it is advantageous to reduce viscosity with a minor portion of low viscosity diol or polyol prior to combining with the prepolymer. It is feasible, however, to utilize the halogenated polyester base resins in the preparation of urethane foams in the molten state at elevated temperatures. In this case the molten polyester is pumped at a controlled rate through the nozzle of a foaming machine where it is contacted with and intimately mixed with a stream of polyisocyanate or isocyanate rich prepolymer. From the nozzle the mixture is delivered to a suitable mold or cavity for foam rise and cure.

In formulating foams there may be employed, in addition to the basic reactants and blowing agents, catalysts such as tertiary amines, tertiary amino alcohols, tertiary ester amines, and the like to speed the reaction. Other compounding ingredients which may also be employed in the preparation of the urethane polymers include wetting agents and emulsifiers to control foam cell structure, carbon black, titanium dioxide, mica, wood pulp, silica, and other pigments and fillers, dyes, fungicides, antioxidants, light stabilizers, and the like.

The foamed urethane products prepared employing the halogenated polyester base resin composition may have densities from about ½ up to about 60 pounds per cubic foot, or higher, with an especially preferred foam product having densities of about 1 to 5 pounds per cubic foot. Depending upon the particular method of blowing, the amounts of ingredients, the type of mold, and the like, the foamed polyurethane products may be open or closed cell. The foam products exhibit good cell structure, excellent flame resistance and are free from discoloration and crevicing (large, hollow, irregular fissures or voids in the body of the foam). These foam products are useful as insulation material for refrigerators; crash pads in automobiles; potting compounding; heat and sound insulating bats; mattresses; pillows; seat cushions; door panels; insulated booths; life preservers and rafts; sponges; scouring pads; and underlays for carpets; and in honeycomb laminates for building construction, airplane construction, and hulls and bulkheads of ships.

In the evaluation and comparison of cross-linked polyester products for flame retardant properties there are a myriad of tests which may be performed from laboratory through production scale. The most important of these from the standpoint of commercial acceptance are described below in order of increasing severity and are referred to throughout the ensuing examples. All of these tests are usually carried out using fiberglass reinforced laminates.

ASTM D635 (American Society for Testing Materials, Pittsburgh, Pennsylvania)

A ½ inch wide by 5 inch long by 1/16 inch thick fiberglass reinforced laminate specimen is clamped from one end lengthwise in a horizontal position so that the ½ inch plane is at an angle of 45° from horizontal. An oxidizing flame from a Bunsen type burner is applied to the free end of the specimen for 30 seconds and then removed. If the flame extinguishes on removal of the flame the specimen is rated as self-extinguishing. If the flame continues to burn after removal of the burner the time required to reach the 4-inch mark is noted and the burning rate reported in inches per minute. This is a rather mild test which generally cannot distinguish between the more fire resistant materials, but is useful for moderately fire resistant products.

ASTM D757 (Globar test)

In this test the end of a similar 5 x ½ x ⅛ inch specimen is contacted with an electrically heated (950° C.) high resistance carbon rod (Globar) and observations are made regarding ignition time, burning times and the extent of burning along the specimen. The results of this test are expressed in inches of burning per minute. The Globar test is more severe than the ASTM D635 test and is suitable for moderately fire retardant specimens which are self-extinguishing in the D635 test. This test lacks sensitivity when highly flame retardant materials are encountered. When flame spread values drop below about 0.1 inches per minute it is rarely possible to distinguish between degree of fire retardancy.

Underwriters bench test

This test has been established by Underwriters Laboratories, Inc., Chicago, Illinois as a laboratory screening test supplementing the difficult to perform ASTM E-84 Tunnel Test. In this test a 2-inch wide by 12-inch long by 1/16-inch thick fiberglass reinforced specimen is suspended in a vertical position protected from air draft. A 1350° F. oxidizing flame from a Bunsen-type burner is applied to the bottom center of the specimen for 30 seconds and removed. The time required for the flame to extinguish after removal of the burner is noted.

HLT-15 Test

The HLT-15 Test is described in the proceedings of The Society of the Plastics Industry, Inc., 17th Annual Technical and Management Conference, Reinforced Plastics Division, February, 1962.

In this test a ½-inch wide by 8-inch long by ⅛-inch thick fiberglass reinforced specimen is suspended vertically. An oxidizing flame from a Bunsen-type burner is applied to the bottom of the specimen in five separate applications of increasing on and off time. After each successive application the time required for the flame to extinguish after removal of the burner is observed. The specimen passes each stage if the flame extinguishers before the next scheduled application of flame. Successful passage of each stage of the test is worth 20 points to a total of 100. This test is able to distinguish between highly fire retardant materials which would give very high flame resistance according to ASTM D635, D757 and the UL Bench Test, previously described.

Military test standard No. LP406—Method No. 2023.2 (Bureau of Ships Test)

In this test a ½-inch by ½-inch by 5-inch long specimen is suspended inside of an electrically heated coil so that the specimen does not touch the coil. The coil is heated with precisely controlled power supply to repetitively uniform high temperature and flame ignition is started by means of a continuous spark immediately above the heat zone. The time required for the specimen to ignite and the time to extinguish after cessation of heating is recorded. This test is a very severe test for fire resistance and is suitable for measuring relative differences between highly fire resistant products but is not directly correlatable to other tests involving direct flame.

ASTM E-84—Tunnel test

This test is employed to establish the relative fire resistance of commercial building materials. Specimens having a total measurement of 25 feet by 20 inches are sealed in a 25-foot long test chamber (tunnel) and ignited at one end by a continuous controlled gas flame. The flame front advance along the specimen during a given time is measured and flame spread ratings are calculated based on an index of zero for asbestos and 100 for red oak. This test is closely related to actual fire conditions and therefore is generally accepted in industry as a standard.

In order that those skilled in the art may more completely understand the present invention and the preferred methods by which the same may be carried into effect, the following specific examples are offered.

EXAMPLE 1

(a) Preparation of base polyester

A four liter resin kettle equipped with thermometer, stirrer, inert gas sparge tube, heated reflux column, and total condenser is charged with 1445 g. (23.3 mols) of ethylene glycol, 1680 g. (11.1 mols) of tetrahydrophthalic anhydride (4 - cyclohexene - 1,2 - dicarboxylic anhydride) and 0.21 g. of hydroquinone inhibitor.

A nitrogen sparge is started and the temperature is raised to 120° C. at which point a mild exotherm to 150° C. takes place. The temperature is maintained at 150° C. for about 1.5 hours after which 1085 g. maleic anhydride (11.1 mols) are added and the temperature raised over a four hour period to 200° C.

The temperature is maintained at 200° C. for an additional six hours during which time the water of condensation is removed through the heated reflux column and total condenser in a manner so that all refluxing glycol is returned to the reactor. At the end of the reaction period the reaction product is transferred to a separate vessel and allowed to cool at room temperature to a somewhat tacky solid. 98.5% of the theoretical water of condensation is collected during the reaction and the yield of base polyester is 90.6% of the initial charge.

The acid value of the product is 33.5 (milligrams of potassium hydroxide per gram of resin). The viscosity of a clear, substantially colorless solution of the base polyester at a concentration of 70% by weight in styrene is 12 stokes as determined by the standard Gardner-Holdt bubble viscometer at 25° C.

(b) Halogenation of base polyester

A four liter glass reactor equipped with thermometer, stirrer, inert gas sparge tube, and reflux condenser is charged with 2000 g. of methylene chloride followed by 1835 g. of the base polyester resin prepared in (a) above. The base resin dissolves easily in the solvent with moderate stirring to form a clear solution having a viscosity of less than one poise. The reaction vessel is then equipped with a graduated, pressure equilibrated addition funnel having an extended outlet reaching below the surface of the polyester solution. Through this device 835 g. (5.2 mols) of liquid bromine are added to the well stirred nitrogen sparged solution at temperatures between 18° C. and 22° C. during about a 2¼ hour period. Throughout this period the bromine color dissipates immediately on contact with the reaction mixture indicating near instantaneous reaction. The amount of bromine added is equivalent to the unsaturation present in the tetrahydrophthalic anhydride moiety less about 2%.

The resulting solution of brominated polyester is only slightly darker in color than before bromination and has a viscosity of less than one poise. The reflux column is replaced by a total condenser and the methylene chloride is completely removed by heating the mixture to 150° to 160° C. under a mild nitrogen sparge. The last traces of solvent are removed by application of a vacuum of 50 to 100 mm. of mercury for 10 to 20 minutes. At the end of this period the molten brominated base resin is transferred to a separate vessel and allowed to cool to room temperature. Only trace amounts of hydrogen bromide are detected in the recovered solvent. The cooled brominated polyester is a very light yellow brittle solid having an acid value of 21.5 and a viscosity, as measured at 70% concentration in styrene at 25° C., of nine stokes. The combined bromine content as found by analysis is 31.5% compared to the theoretical 31.3%. The styrene solution has a color of less than 400 on the APHA scale. The addition of either about 3% of trimethylphosphate or about 0.5% epichlorohydrin to this mixture reduced the color to less than 200 on the APHA scale.

(c) Evaluation

To a well stirred solution of 0.066 g. of hydroquinone in 342 g. of styrene at 70° C. are added 658 g. of the brominated base polyester prepared in (b) above, to form a solution having a viscosity of approximately 4.5 stokes at 25° C. The resulting brominated polyester solution, containing approximately 20.7% bromine, on addition of 1% by weight of tert-butyl peroctoate is converted to a hard, tough insoluble cross-linked product at 180° F. in a short period of time.

To evaluate fire retardant properties of the brominated polyester styrene mixture, ⅛″ thick glass reinforced laminated are prepared from two layers of 2 oz. per square foot fiberglass mat and the resin catalyzed with 1% tert-butyl peroctoate. After curing 3 hours at 180° F. the laminates are tested according to the Globar Test (ASTM D757) and are found to have a burning rate of about 0.14 inch per minute.

Similar laminates, 1/16″ thick, prepared with a single layer of glass mat have a burning time of less than three seconds when tested according to the U. L. Bench Test. Specimens taken from the same laminate are non-burning according to the ASTM D635 test.

Using a single layer of 2½ oz. per square foot glass mat a 0.055 inch thick laminate is applied to one side of several ⅜ inch thick plywood boards 20 inches in width and totaling 25 feet in length. Room temperature cure is achieved using 0.015% cobalt octoate and 1% methyl ethyl ketone peroxide added to the brominated polyester solution. After 24 hours post-cure at 140° F. good Barcol surface hardness of 40 to 50 is obtained. (Barcol Impressor model 934-1 manufactured by the Barber Colman Company.)

When tested by the standard Tunnel test (ASTM E-84) this panel has a flame spread rating of 77, illustrating the excellent flame retarding ability of even thin layers of the brominated polyester. Plywood without the coating consistently gives flame spread ratings under the same conditions in the 200 to 400 range.

EXAMPLE 2

(a) Preparation of polyester 1548 pounds of ethylene glycol and 1800 pounds of tetrahydrophthalic anhydride are charged to a 500 gallon stainless steel reaction vessel equipped with agitator, heating controls and partial reflux condenser. 204 grams of hydroquinone are added and the mixture heated to 155° C. and maintained at that temperature for 1½ hours. At that time 1150 pounds of maleic anhydride are added and heating is continued to 195° to 200° C. and maintained at that temperature for about 10 hours. During the reaction period the water of condensation is continuously removed through the partial reflux condenser with the aid of a carbon dioxide sparge. The polyester base resin is then transferred to separate vessels and allowed to cool to ambient temperature.

The cooled polyester has a final acid value of 36 and on dissolution to a 70% concentration in styrene forms a clear solution having a viscosity of approximately 13 stokes and a color of approximately 100 on the APHA standard. The resin yield is 4,074 pounds.

(b) Bromination of polyester 1865 grams of this polyester base resin are dissolved in 1865 grams of methylene chloride in a glass reactor equipped for bromination as in Example 1. 847 grams of bromine are added over a four hour period at 13° to 18° C. The resulting solution is clear, has a viscosity of 0.75 poise and a specific gravity of 1.525. Solvent distillation is carried out at atmospheric pressure with the aid of an inert gas sparge up to a temperature of 175° C. over a 4 hour period. Approximately 0.2% HBr is found in the recovered solvent. On cooling, the brominated polyester is a pale yellow brittle solid having a bromine content of approximately 31.5%, a viscosity of about 5 stokes when dissolved to a concentration of about 68% in styrene. The styrene solution has a color of approximately 400 on the APHA standard.

A mixture of 68.5% brominated polyester base resin, 31.0% styrene and 0.5% epichlorohydrin had a bromine content of about 21.6%, a viscosity of about 5 stokes at 25° C. and a color of approximately 175 on the APHA standard. Laminates prepared from this solution, as in Example 1, have a burning time according to the U. L. Bench test of less than 5 seconds.

The above polyester solution is catalyzed with 1% benzoyl peroxide and used to prepare a ½ inch thick laminate with 40 plies of glass cloth. After curing at 100° C. for 24 hours, specimens from the laminate are subjected to the Bureau of Ships Test (Federal Test Standard 406—Test Method 2023) with results of: Ignition time 75 seconds, extinguishing time 82 seconds. Results of 55 seconds minimum and 125 seconds maximum respectively, are usually considered passing.

EXAMPLE 3

187 pounds of the polyester base of Example 2 are dissolved in 187 pounds of methylene chloride and transferred to a 50 gallon glass-lined vessel equipped with agitator, reflux and total condensers, receiver, inert gas sparge, and means of adding liquid bromine below the surface of the reaction mixture. 85 pounds of liquid bromine are added contninuously over a 5½ hour period while the reaction temperature is maintained at 16° to 28° C. with cooling. After completion of the bromination the methylene chloride is distilled out by application of heat to 150° C. A carbon dioxide sparge is maintained during the distillation with a vacuum of bout 26 inches of mercury applied during the last hour of the six hour stripping cycle. A pale yellow molten brominated polyester which is recovered is transferred to a separate vessel and allowed to cool to a hard brittle solid having a bromine content of about 31.3%.

The following three copolymerizable mixtures are prepared from this base.

Mix (a)

67 parts of the brominated polyester resin are dissolved in 33 parts of styrene containing 0.0067 part of hydroquinone. To this mixture are added 0.5 part of epichlorohydrin, 0.03 part of zinc octasol, 0.2 part of 2-hydroxy-4-methoxy benzophenone, 0.5 part of phenyl salicylate and 0.015 part of mixed alkyl trimethyl ammonium chloride. This mixture has a viscosity of 4.4 stokes and gives a U. L. bench test burning time of less than 5 seconds when evaluated as in Example 1.

Mix (b)

65 parts of the brominated polyester base, 26 parts styrene, 0.0065 part of hydroquinone, 4.7 parts methyl methacrylate, 4.7 parts triethylphosphate, 0.5 part epichlorohydrin, 0.5 part phenyl salicylate, 0.2 part 2-hydroxy-4-methoxy benzophenone, 0.03 part zinc octasol and 0.016 part of a mixed alkyl trimethyl ammonium chloride are combined to give a clear very low color copolymerizable mixture having a viscosity of 4.0 stokes. This mixture when cured in 1/16 inch thick laminates using 1% cumene hydroperoxide and 1% tert-butyl perbenzoate as catalysts and prepared as described in Example 1 gives burning times of less than 2 seconds when tested according to the U. L. bench test. The Barcol surface hardness of these laminates is 45 to 50, indicating good cure.

Mixes (a) and (b) after catalyzing each with 1% cumene hydroperoxide and 1% tert-butyl perbenzoate are used to produce approximately 100 lineal feet each of 1/16 inch thick by 26 inches wide translucent corrugated building panels on a commercial panel machine. In such machine a continuous width of fiberglass mat is impregnated with catalyzed resin, encased both sides with cellophane, and pulled through an oven having temperature zones of increasing temperatures up to about 250° F. During the heating period the resin-glass composition is gelled, the corrugations are formed prior to hard cure and the panels emerge from the oven fully cured. The Barcol hardness of both sets of panels thusly produced are in the 40 to 50 range and all panels weigh approximately 10 ounces per square foot.

U. L. bench tests performed on specimens from these panels give burning times of less than 2 seconds. Full sized tunnel tests performed according to ASTM E-84 give flame spread ratings of 75 and 35 respectively, for mix (a) and (b). Similar standard non-fire retardant panels have flame spread ratings in the range of 300 to 400, with the best commercially available fire retardant panel of equal weight being in the range of 50 to 100.

Mix (c)

73.0 parts of the brominated polyester base, 24.2 parts styrene, 0.0075 part hydroquinone, 2.8 parts triethyl phosphate, and 0.5 part epichlorohydrin are combined to form a clear, low color, polymerizable mixture having a viscosity of about 27 stokes at 25° C.

Mix (c) is catalyzed with 1% tert-butyl peroctoate and used to mold fiberglass reinforced five gallon capacity wastebaskets in a matched metal die heated to about 250° F. The molded translucent products are substantially colorless, and have a smooth even surface of approximately 40 Barcol hardness. Four ounces of shredded newsprint placed in such basket and ignited, extinguished itself within 3 minutes. Similar baskets made from a commercial propylene glycol: isophthalic acid: maleic anhydride polyester containing enough of the additive tris(2,3-dibromopropyl)phosphate to result in approximately the same bromine and phosphorous contents require about 9 minutes for the flame to extinguish when evaluated under the same conditions. The Barcol hardness of the baskets made with this additive type fire retardant resin is only about 20 to 25.

EXAMPLE 4

37.9 percent propylene glycol (equivalent to 1.05 mols), 43.3% tetrahydrophthalic anhydride (equivalent to 0.6 mol), 18.8% maleic anhydride (equivalent to 0.4 mol), and 0.02% hydroquinone, are charged to a stainless steel vessel equipped for polyesterification reactions. Under a continuous carbon dioxide sparge the ingredients are heated to about 170° C. at which point the condensation reaction starts as evidenced by the removal of water. The reaction temperature is then slowly increased to 205° C. and maintained constant to an acid value of 98. A further temperature increase to 215° C. is made and maintained at this temperature until an acid value of 38 and a viscosity of 9 stokes at 25° C. as determined at a 70% concentration in styrene is reached. Heating is discontinued and the polyester base resin is cooled to room temperature. The product is a brittle solid having a very low color. 162 pounds of this polyester base resin is dissolved in 207 pounds of methylene chloride and charged to a 50 gallon glass-lined reactor as described in Example 3.

78 pounds of liquid bromine are added continuously over a 7 hour period while maintaining the reaction temperature at 25° to 33° C. with cooling. On completion of the bromine addition the solvent is distilled out at atmospheric pressure up to 135° C. The brominated base polyester is transferred to separate vessels for cooling. This product contains 32.5% combined bromine and has a viscosity of about 10 stokes when measured as a 70% solution in styrene at 25° C.

The U. L. bench test applied to laminates prepared from a 67% solution of this brominated polyester in styrene as described in Example 1 gives burning times of less than 10 seconds.

The results from the Bureau of Ships burning test (Federal Test Standard 406—Test Method 2023) employing this polyester on 40 ply, ½ inch laminates prepared as described in Example 2 gives an average ignition time of 65 seconds; and average burning time of 71 seconds.

EXAMPLE 5

(a) Preparation of dibromotetrahydrophthalic anhydride

To a well stirred slurry of 456 grams (3.0 mols) of 4-cyclohexene - 1,2 - dicarboxylic anhydride (tetrahydrophthalic anhydride) in 900 mls. of carbon tetrachloride and 100 mls. of glacial acetic acid are added 480 grams (3.0 mols) of bromine over a period of ten hours at 18° to 25° C. An additional 900 mls. of carbontetrachloride are added during this period to maintain adequate stirring of the fine granular suspension of 4,5-dibromocyclohexane - 1,2 - dicarboxylic anhydride (dibromotetrahydrophthalic anhydride) which forms. The product obtained after filtration, washing with toluene, and recrystallization from methyl ethyl ketone has a melting point of 142° to 144° C. and a bromine content of 48% compared to 51.3% theoretical.

(b) Preparation of polyester

A one-liter resin kettle equipped for polyesterification reactions is charged with 127 grams (1.67 mols) of propylene glycol, 183 grams (0.79 mols) of the dibromotetrahydrophthalic anhydride from (a) and 77.5 grams maleic anhydride (0.79 mols). 0.5% sodium acetate is added as an aid to esterification and the mixture is heated to 130° C. At that point condensation starts and continues for a period of 10 hours up to to 175° C. Instead of the calculated 27.5 mls. of water the condensate is made up of 47 mls. top layer and 21 mls. bottom layer. At a plateau acid value of 83, 0.35 mol of additional propylene glycol is added to compensate for the decomposition losses. The final acid value is 38 and the resulting polyester has a viscosity in 30% by weight of styrene of 5 stokes at 25° C. The styrene solution is turbid and has an unsatisfactory medium brown color in excess of 2000 on the APHA standard. The bromine content of the solid polyester base is only 23% compared to the theoretical 29.8% based on the amount of dibromotetrahydrophthalic anhydride charged. The bottom layer of condensate is found to contain the lost bromine. It is believed that the dibromotetrahydrophthalic anhydride dehydrobrominated at the esterification temperatures employed causing the HBr formed to act on the propylene glycol as a catalyst in a dicyclization reaction and react directly with propylene glycol to form propylene bromohydrin which would distill from the esterification reaction as an azeotrope with water.

Glass reinforced laminates prepared from a 70% concentration in styrene of this bromine containing polyester are subjected to the Globar Burning Test (ASTM D–757)

and the U. L. Bench Test. The following data are obtained:

Globar test—0.19 inch/min.
U. L. bench test—Not self-extinguishing.

EXAMPLE 6

10,188 grams (134 mols) of propylene glycol, 4,716 grams (31.9 mols) of phthalic anhydride, 14,832 grams (31.9 mols) of tetrabromophthalic anhydride, 6,264 grams (64 mols) of maleic anhydride, and 59 grams of sodium acetate are charged to a 10 gallon stainless steel vessel equipped for polyesterification reactions. The mixture is heated to 160° to 170° C. to start the condensation reaction and thereafter is processed at 193° to 194° C. during a period of approximately 7 hours to an acid value of 25 and viscosity of 4.9 stokes when measured at a 70% concentration in styrene at 25° C. After the reaction is discontinued, 3.4 grams of hydroquinone are added and the bromine containing polyester is transferred to separate vessels and allowed to cool to a light yellow, hazy, brittle solid containing 30.4% bromine.

69 parts of the bromine containing polyester are combined with 31 parts of styrene to form a copolymerizable mixture having a light yellow color, a hazy appearance, a viscosity of 4.0 stokes at 25° C. and a bromine content of 21.0%. This mixture is used to prepare both 1/16 inch thick laminates and ½ inch thick 40 ply laminates previously described in Examples 1 and 2. These laminates were tested for flame resistance according to the U. L. Bench Test and the Bureau of Ships Test (Test Method 2023). The following data are obtained:

U. L. bench test—Failed—Not self-extinguishing
Bureau of Ships test—Ignition time—75 sec.; (passes)
Extinguishing time—135 sec. (fails).

Thus by equating Examples 5 and 6 with previous examples it can readily be seen, based on a comparison of flame retardancy vs. amount of halogen used, that the post halogenated polyesters of this invention give fire retardancy superior to polyesters prepared from halogenated components.

EXAMPLE 7

A polyester based on chlorendic anhydride was prepared according to the instructions and the proportions of raw materials set forth in Example 1 of U.S. 2,779,701 as follows:

172.6 grams of ethylene glycol (2.78 mols) and 294.2 grams (2.78 mols) of diethylene glycol were charged to a two liter resin kettle equipped for polyesterification reactions and the mixture was heated to about 100° C. 1290 grams of chlorendic anhydride (1,4,5,6,7,7-hexachlorobicyclo - (2.2.1) - 5 - heptene-2,3-dicarboxylic anhydride) (3.48 mols) and 231.4 grams of maleic anhydride (2.36 mols) were added and the mixture was further heated to about 155° C. at which point the condensation reaction began.

The mixture was reacted at temperatures of 169° to 171° C. until an acid value of 55 was reached. 11.8 grams of tetrahydrofurfuryl alcohol were added and the polyester further processed at 171° to 174° C. to an acid value of 44. An 1895 gram yield of polyester was obtained having a chlorine content of 38.4% and a viscosity of approximately 4.3 stokes when measured at a concentration of 70% in styrene at 25° C.

Three separate copolymerizable mixtures of this polyester with varying concentrations of styrene were prepared as indicated below. All mixes had low color but were turbid. Using these mixtures catalyzed with 1% of benzoyl peroxide, 1/8 inch thick 2-ply and ½ inch 40-ply glass reinforced laminates were prepared, cured, and subjected to the HLT-15 burning test and the Bureau of Ships burning test (Method No. 2023.2) as previously decribed.

Results are shown in Table I.

TABLE I

| Mix | Percent base resin | Percent styrene | Viscosity, stokes | Percent chlorine | Burning tests | |
|---|---|---|---|---|---|---|
| | | | | | HLT-15 | Buships |
| a | 70 | 30 | 4.3 | 26.8 | 50 | (1) |
| b | 81 | 19 | 360 | 31.1 | 55 | |
| c | 56.5 | 43.5 | 0.5 | 21.5 | 20 | (2) |

[1] Ignition: 72 sec.; Extlng: 135 sec.
[2] Ignition: 71 sec.; Extlng: 167 sec.

Mix (a) is at a viscosity suitable for practical handling in commercial use. With mix (b) an attempt was made to achieve maximum chlorine content. The viscosity was too heavy to prepare the 40-ply laminate for the Bureau of Ships Test and also due to the high viscosity only one layer of glass could be used in the HLT-15 laminate.

The burning tests demonstrate that these chlorinated polyester resins are inferior at the same halogen content, 1½ times the halogen content and at the same viscosity as halogenated polyester resins prepared by the method of the present invention.

EXAMPLE 8

(a) Polyester preparation

A four-liter resin kettle equipped for polyesterification as previously described is charged with 764 grams (12.3 mols) ethylene glycol, 808 grams (7.6 mols) diethylene glycol and 1588 grams (10.5 mols) tetrahydrophthalic anhydride. The temperature is brought to 160° C. and kept there for one-half hour, while reaction mixture is sparged with nitrogen. At this point 840 grams (8.6 mols) maleic anhydride are added and temperature is increased over a 3 hour period to 200° to 205° C. and kept at this temperature for another 6 hours. At the end of the reaction 93% of theoretical water is collected. The polyester has an acid value of 29.1 and the yield is 91.4%. A 30% styrene solution has a color of less than 100 APHA and a viscosity of 6.5 stokes. To the hot resin 0.4 gram of hydroquinone is added and the mass is cooled to room temperature.

(b) Bromination 2093 grams of the base polyester prepared in (a) are dissolved in 2093 grams of methylene chloride at ambient temperature. To this solution are added 935 grams (5.84 mols) of bromine over a period of 5 hours while maintaining the temperature between 15° to 20° C. The resulting solution is very pale yellow and clear. Solvent distillation is carried out as before between 42° C. to 143° C. The resulting brominated polyester base is a very pale colored, brittle solid on cooling, having an acid value of 16, a bromine content of 30.9% and a viscosity of 6 stokes as measured as a 70% concentration in styrene at 25° C. HBr recovered from the distilled solvent is 0.27% based on the brominated polyester. 68 parts of this brominated polyester are dissolved in 32 parts of styrene containing about 0.007 parts of hydroquinone to form a copolymerizable mixture having a viscosity of 4.4 stokes at 25° C. and bromine content of 21%.

(c) Evaluation

In the following test flame resistance and physical strength of the brominated polyester prepared in (b) are compared to a commercially available polyester-styrene copolymerizable mixture comprising approximately 1.10 mols ethylene glycol, 0.33 mols maleic anhydride and 0.67 mols of chlorendic anhydride, containing approximately 27% chlorine and is believed to contain 3 to 5% of triethylphosphate as a booster flame retardant. Fiberglass reinforced laminates for burning tests are prepared as previously described. The laminates used for physical strength tests are prepared by impregnating twelve layers of Type-181 glass cloth with each of the polyester resins catalyzed with 1% benzoyl peroxide, pressing the laminates to ⅛ inch stops between platens heated to 200° to 220° F. for 1 hour and further post-curing the laminates in an oven at 300° F. for 2 hours. These laminates which contain 65 to 68% glass are tested according to procedures described in the Bureau of Ships test, (Federal Test Standard No. 406—Test Method No. 2023). Results are given in Table II.

TABLE II

| | Example 8 brominated polyester | Chlorendic polyester |
|---|---|---|
| Flexural strength at 77° F., p.s.i | 74,100 | 63,700 |
| Modulus of elasticity at 77° F., p.s.i | $2.8 \times 10^6$ | $3.3 \times 10^6$ |
| Tensile strength at 77° F., p.s.i | 54,900 | 48,200 |
| Compressive strength at 77° F., p.s.i | 50,300 | 33,900 |
| Flammability (ASTM D-635) | Nonburning | Nonburning |
| Flammability (HLT-15 test) | 100 | 88 |
| Flammability (ASTM D-757-Globar) | 0.08″/min. | 0.34″/min. |

As can be seen from these data the brominated polyester-containing laminates are in most instances superior in both flame retardant and physical strength properties to the commercially available halogen-containing polyester.

cobalt octoate. This resin mixture containing approximately 18.2% bromine is catalyzed with 1% methyl ethyl ketone peroxide and used to prepare several ⅛-inch thick glass reinforced laminates comprising two layers of 2 oz. per square foot glass mat with a 10 mil thick glass mat surface veil on both sides. The laminates are allowed to gel and cure at room temperature with no elevated temperature postcure.

Similar laminates are prepared from a commercial polyester resin widely used for fabrication of chemical and corrosion resistant equipment. This product is composed of a polyester comprising 0.5 mol of chlorendic anhydride, 0.5 mol fumaric anhydride and 1.1 mols propylene glycol, said polyester dissolved in styrene to form a copolymerizable mixture. The product as used in industry contains approximately 18% chlorine.

All laminates are checked for flexural strength and Barcol surface hardness prior to immersion in various corrosive media at various temperatures. After three-month exposure the laminates are removed from the test media and retested for flexural strength and Barcol hardness. Results are reported in Table III in percent retention of original test values.

TABLE III
[Comparison of corrosion resistance of brominated polyester of Example 9 to commercial chlorendic resin]

| | | Percent flex. strength ret. | | Percent Barcol ret. | |
|---|---|---|---|---|---|
| Test media | Temp., °F. | Ex. 9 | Comercial resin | Ex. 9 | Commercial resin |
| 10% NaOH | 170 | 52 | 0 | 71 | 0 |
| 5% HNO₃ | 170 | 97 | 96 | 100 | 90 |
| 5% H₂SO₄ | 170 | 90 | 85 | 97 | 85 |
| 10% HCL | 170 | 100 | 98 | 95 | 83 |
| 10% NaCl | 170 | 100 | 100 | 100 | 100 |
| 5% acetic acid | 170 | 95 | 87 | 97 | 75 |
| 10% NH₄OH | 170 | 94 | 54 | 79 | 53 |
| Deionized water | 170 | 98 | 87 | 97 | 53 |
| Toluene | 75 | 52 | 53 | 8 | 0 |
| Ethyl gasoline | 75 | 100 | 100 | 100 | 75 |
| Wet chlorine | 212 | 35 | 28 | 53 | 31 |

EXAMPLE 9

To a two-liter resin reaction kettle equipped for polyesterification reactions as previously described are charged 874 grams (8.4 mols) of neopentyl glycol, 746 grams (4.90 mols) of tetrahydrophthalic anhydride, 381 grams (3.29 mols) of fumaric acid, and 0.6 grams of hydroquinone. On application of heat the polyesterification reaction starts at 175° C. and is continued through seven hours duration at temperatures ranging from 175° C. to 218° C. The reaction is discontinued at an acid value of 24 and a viscosity of 4.4 stokes as measured at a 60% concentration in styrene at 25° C. On cooling, the product is a brittle solid having a very low color.

2200 grams of the polyester base are dissolved in 1800 grams of methylene chloride at ambient temperature. To this solution are added 962 grams bromine over a 4½ hour period while keeping the reaction temperature below 30° C. with cooling. The removal of the methylene chloride is carried out in an inert atmosphere over a 5-hour period up to a temperature of 155° C. The final brominated polyester has a bromine content of 30.4% and a viscosity of 4.1 stokes when measured at a 60% solution in styrene.

A solution of 60 parts brominated base resin and 40 parts of styrene are prepared to which is added 0.4 part Additional ⅛-inch thick test laminates are prepared as previously described and are subjected to the Globar burning test (ASTM D–757) with the following burning rate results:

Example 9 Brominated resin—0.09 inch/min.
Commercial chlorendic resin—0.39 inch/min.

EXAMPLE 10

In order to compare further the products of the direct bromination process to fire retardant polyesters formulated by the non-reactive additive route, two mixes were prepared from commercially available products typically used for this purpose.

The base resin employed is a propylene glycol: isophthalic: maleic anhydride polyester of molar ratios 1.05:0.33:0.67. Using this base the following mixes were prepared:

| | Mix A | Mix B |
|---|---|---|
| Polyester base resin | 38.5 | 39.0 |
| Styrene | 31.5 | 32.0 |
| Chlorinated paraffin | 30.0 | |
| Tetrakis(2,3-dibromopropyl)silicate | | 29.0 |
| Chlorine content, percent | 21.0 | |
| Bromine content, percent | | 20.8 |

One-eighth inch thick fiberglass reinforced laminates were prepared using 2 layers of 2 oz. per square foot glass mat and the resins catalyzed with 1% cumene hydroperoxide and 1% tertbutylperocoate. The panels were cured for 3 hours at 125° C.

A similar laminate was prepared from a 30% styrene solution of the brominated polyester base of Example 8.

All laminates were tested for flexural strength, Barcol hardness, and were subjected to the HLT–15 burning test before and after immersion in boiling water for 12 hours.

|  | Flexural strength, p.s.i. | Barcol | HLT-15 Unboiled | Boiled |
|---|---|---|---|---|
| Mix A | 15,400 | 45 | 5 | 0 |
| Mix B | 18,400 | 35 | 60 | 20 |
| Ex. 8 | 19,500 | 50 | 100 | 100 |

EXAMPLE 11

776 grams (12.5 mols) of ethylene glycol, 314 grams (1.3 mols) of 2,2'-bis(p - hydroxy cyclohexyl)propane, and 1195 grams (7.85 mols) of tetrahydrophthalic anhydride are reacted in a three-liter resin kettle equipped for polyesterification over a period of eight hours at 207° C. maximum temperature to an acid value of 22. After cooling to 140° C., 515 grams (5.25 mols) of maleic anhydride are added and the reaction mixture is processed at approximately 210° C. for six hours. 0.28 gram of hydroquinone is added and the reaction discontinued. On cooling, the reaction product is a brittle solid having an acid value of 15 and a viscosity of 20 stokes as measured as a 70% solution of the resin in styrene at 25° C.

950 grams of the polyester base resin are dissolved in 1070 grams of methylene chloride after which 462 grams of bromine are added over a five-hour period at temperatures ranging from 32° C. to 43° C. On removal of the methylene chloride by distillation up to 145° C., the final product is a pale yellow very brittle solid having an acid value of 13 and a viscosity of 23 stokes when dissolved in 30% by weight of styrene. The bromine content of the solid is 31.7%.

1/16-inch laminates prepared from a 30% styrene solution of this brominated polyester catalyzed with 0.6% cumene hydroperoxide and 1% benzoyl peroxide extinguish in less than 4 seconds when tested according to the U. L. bench test.

EXAMPLE 12

840 grams (13.55 mols) of ethylene glycol and 784 grams (5.15 mols) of tetrahyrophthalic anhydride are reacted in a three-liter polyesterification kettle at 160° to 190° C. to an acid value of 14. 5550 grams (1.29 mols) of 1,2,3,4,9,9-hexachloro-1,4,4a5,6,7,8,8a-octahydro-1,4-methanonaphthalene-6,7-dicraboxylic anhydride, and 626 grams (6.4 mols) of maleic anhydride are added after cooling to 145° C. and the resin is further reacted for an additional eight hours at temperatures between 160° and 210° C. 0.14 gram of hydroquinone are added and the reaction mass is allowed to cool to a very brittle solid having an acid value of 22 and a viscosity of 13 stokes when dissolved in 30% by weight of styrene.

945 grams of the polyester base resin dissolved in 1070 grams of methylene chloride are brominated with 295 grams of bromine over a period of four hours at temperatures between 33° C. and 41° C. Distillation of methylene chloride is carried out at temperatures up to 135° C. to recover a brominated polyester resin which on cooling is a brittle solid containing 23.8% bromine and 8.1% chlorine.

1/16-inch laminates made from a 70% solution of this brominated base resin in styrene gave a burning time of less than 5 seconds when tested according to the U.L. bench test.

EXAMPLE 13

To a twio-liter glass estertification kettle are charged 1096 grams (7.6 mols) of 1,4-cyclohexane dimethanol and 550 grams (3.6 mols) of tetrahydrophthalic anhydride. The mixture is heated to 110° C. to form a homogeneous melt and 354 grams of maleic anhydride (3.6 mols) are added. The polyesterification is carried out during a period of about seven hours at 180° to 209° C. until the acid value decreases to 30 and the viscosity in 35% by weight of styrene is 22 stokes at 25° C. 0.1 gram of hydroquinone is added and the resin is allowed to cool to a brittle solid.

227 grams of the polyester base are dissolved in 402 grams of methylene chloride and treated with 72 grams of bromine at temperatures ranging from 10° to 18° C. The solvent is removed at temperatures up to 130° C. to form a very light colored brominated polyester having a bromine content of 24.1%.

1/8-inch laminates prepared as previously described from a solution of 65% by weight of this brominated polyester in styrene give burning rates of 0.16 to 0.18 inch per minute when tested according to the Globar test (ASTM D–757).

EXAMPLE 14

Into a three-liter kettle equipped for polyesterification as previously described are placed 1260 grams (7.7 mols) of endic anhydride [endo-cis-bicyclo(2.2.1)-5-heptene-2, 3-dicarboxylic anhydride] and 920 grams (14.85 mols) of ethylene glycol. The mixture is heated to 90° C. to form a homogeneous melt and 620 grams (6.33 mols) of maleic anhydride are added. The reaction mixture is further heated for approximately eight hours at temperatures of 180° to 212° C. 0.14 gram of hydroquinone are added and the base polyester is cooled to room temperature. This product has an acid value of 22 and a viscosity of 10 stokes when measured at a 70% concentration in styrene.

951 grams of the base polyester are dissolved in 1075 grams of methylene chloride. Using the same equipment as previously described for bromination reactions, 327 grams of bromine are added over a three-hour period at 11° to 15° C. As in previous reactions the bromine reacts nearly instantaneously to form a very pale yellow solution. The methylene chloride is evaporated over a three-hour period at tempreatures up to 135° C. The brominated polyester is then cooled to 105° C., treated with 0.13 gram of hydroquinone and dissolved in styrene to a concentration of 74%. This solution has a viscosity of 6.2 stokes at 25° C. The bromine content of the brominated base polyester is 25.2%.

1/16-inch thick laminates prepared from this styrene solution (bromine content=18.2%) catalyzed with 0.6% cumene hydroperoxide and 1% benzoyl peroxide, and cured for three hours at 180° F., have a Barcol hardness of 50 indicating good cure. The U.L. bench test performed on these laminates gives extinguishing times of less than 6 seconds after removal of the flame.

EXAMPLE 15

To a four-liter resin kettle equipped for polyesterification reactions are charged 965 grams (11.0 mols) of 2-butene-1,4-diol, 555 grams (9.1 mols) of ethylene glycol, and 1370 grams (9.3 mols) of phthalic anhydride. The mixture is heated to 90° C. to form a homogeneous melt and 910 grams (9.3 mols) of maleic anhydride are added. The exterification is carried out over and extended period at temperatures held to 130° to 150° C. due to the tendency of the butene diol to cyclize and distill out together with the normal water of condensation. During the reaction the amount of butene diol loss is determined from the amount of the cyclization product, 3-dihydrofuran, found in the distillate and is replaced in the reaction mixture with fresh 2-butene-1,4-diol. The reaction is discontinued at an acid value of 57 and a viscosity of 25 stokes when measured at a 70% concentration of base polyester in styrene at 25° C.

951 grams of the base polyester resin are dissolved in 951 grams of methylene chloride. To this solution are added over a seven-hour period 464 grams of bromine at temperatures of 5° to 10° C. The bromine is absorbed readily as in prior examples to form a clear pale yellow solution. The methylene chloride is evaporated as before over a 3½ hour period at temperatures up to 136° C. to recover a brominated polyester which, on cooling, is a brittle solid having a bromide content of 32.7% and a viscosity of 9 stokes when measured as a solution in 34% by weight of styrene at 25° C.

Laminates suitable for the Globar burning test (ASTM D-757) and the U.L. bench test are prepared from a 34% by weight styrene solution of this brominated polyester with conventional catalysts and curing cycles as previously described. Barcol surfaces hardness is 45 to 50. Buring tests on these laminates have the following results:

U.L. Bench Test—0.07 inch/min.
Globar Test—Extininguishing time less than 5 seconds.

EXAMPLE 16

400 grams of the base polyester of Example 1(a) are dissolved in 400 grams of methylene chloride. To this solution, maintained at a temperature between 5° C. and 14° C. by cooling, are added below the liquid surface 81 grams of chlorine gas over a period of about four hours. The reaction is near instantaneous as with bromine. The methylene chloride is removed by distillation at temperatures up to 155° C. to recover a chlorinated polyester which when cooled is a brittle solid having a chlorine content of 16%. A 65% by weight concentration of the chlorinated base resin in styrene has a viscosity of 15 stokes at 25° C. and a color of less than 200 APHA. Laminates prepared as previously described are cured without difficulty and exhibit a Globar (ASTM D-757) burning rate of 0.31 inch/min.

EXAMPLE 17

In polyesterification equipment as previously described 1347 grams (17.7 mols) of propylene glycol are reacted with 1653 grams (16.9 mols) of maleic anhydride at temperatures up to 210° C. until an acid value of 27 is reached.

801 grams of this base polyester resin are dissolved in 900 grams of methylene chloride and 545 grams of bromine are added over a 24-hour period at 40° to 43° C. The addition of bromine to the maleic moiety takes place with difficulty as evidenced by a color of excess bromine present at all times and the generation of significantly greater than normal amounts of hydrogen bromide. The amount of bromine added is equivalent to approximately two thirds of the unsaturation present thus theoretically leaving one third free to copolymerize later with styrene. After removal of the methylene chloride the resultant brominated polyester is a light brown brittle solid having a bromine content of 41.4%, an acid value of 83, and a viscosity at a 70% concentration in styrene of 8 stokes at 25° C.

Attempts to prepare laminates for burning tests from the styrene solution using conventional catalysts are unsuccessful, i.e., the mixture will gel but no Barcol reading is obtained even on prolonged heating.

This example demonstrates that while bromination does take place with difficulty in the absence of non-alpha, beta-ethylenic unsaturation satisfactory curable polyester products are not obtatined.

EXAMPLE 18

A hydroxyl rich polyester was prepared by reacting 2280 grams (17.2 mols) of trimethylol propane with 1220 grams (8.0 mols) of tetrahydrophthalic anhydride in a 4-liter reaction kettle equipped for polyesterification reactions. The mixture was reacted over a period of 8 hours at temperatures of 155° C. to 195° C. to an acid value of 12. On cooling, the resulting tetrafunctional polyol had a viscosity of 200 stokes at 25° C.

2284 grams of this base polyester were dissolved in 1760 grams of methylene chloride and treated with 830 grams of bromine over a 3½ hour period at 14° C. The resulting brominated polyol after removal of the solvent was a clear very light colored semisolid having an acid value of 4, a bromine content of 27%, and a hydroxyl equivalent of 125.

An isocyanate rich prepolymer was prepared by reacting 800 grams of tolylene diisocyanate with 200 grams of the brominated polyol at about 75° C. The prepolymer, to which was added 0.5% of 2,6-ditertiary butyl-4-methyl phenol as an antioxidant, had a viscosity of 6 stokes at 25° C., an amine equivalent of 132 and an excess NCO content of 31.9%.

In order to reduce the viscosity of the brominated polyol so that it could be combined with the prepolymer, 72 parts of brominated polyol were blended with 28 parts of diethylene glycol to form a polyol mixture having a viscosity of about 120 stokes at 25° C. and a hydroxyl equivalent of 87.

A foam was then prepared by combining 62.3% prepolymer, 35.5% of the diethylene glycol modified polyol, 0.6% water, 0.1% N-ethyl morpholine, 1.0% DC-113 (a proprietary silicone surfactant manufactured by the Dow Corning Corp.) and 0.5% of Surfactol 365 (a proprietary castor oil based surfactant manufactured by the Baker Castor Oil Co.). The cream time of this formulation was 1.5 minutes and the foam was fully risen after 6 minutes to a rigid structure having a density of 3.5 lbs./cu. ft.

Specimens cut from this foam were very slow burning to self-extinguishing when tested according to ASTM D-1692. In this test a ½-inch thick by 2-inch by 6-inch foam specimen is supported horizontally, flatwise on a piece of hardware cloth. A bunsen burner with a wing top is placed under one end of the specimen for a duration of one minute. On removal of the flame the burning rate and/or self-extinguishing characteristics are observed.

EXAMPLE 19

To a 3 liter kettle equipped for polyesterification were charged 835 grams (13.5 mols) of ethylene glycol, 972 grams (9.9 mols) of maleic anhydride, 472 grams (3.3 mols) of phthalic anhydride and 699 grams (5.3 mols) of bicyclopentadiene. The mixture was heated to 128–142° C. and kept at this temperature for 3 hours. The temperature was then slowly increased to 195° C. and kept there for another 13 hours until the acid value was 27 and the viscosity 5.5 stokes as measured at 70% concentration in styrene at 25° C. About 50 cc. (48 g.) of unreacted bicyclopentadiene were collected during the reaction together with the water of condensation. Actual amount of bicyclopentadiene having reacted thus was 651 g.

1499 grams of the above base polyester were dissolved in an equal weight of methylene chloride. Using the bromination equipment previously described, 560 grams of bromine were added to the well stirred solution over a period of 6 hours keeping the temperature between 7–10° C. The bromine reacted immediately. The methylene chloride was evaporated over a 5 hour period by increasing the batch temperature to 133° C. The hot polyester was dissolved in styrene to a final concentration of 74.4%. This solution had a viscosity of 9.0 stokes. The brominated polyester base had an acid value of 29.0, and a bromine content of 27.2%.

$\frac{1}{16}$-inch thick glass reinforced laminates prepared from the above styrene solution (bromine content 20.8%)

catalyzed with 0.7% cumene hydroperoxide and 0.5% benzoyl peroxide paste (50% active) and cured for 3 hours, had a Barcol hardness of 50. The U.L. bench test on these laminates gave burning times of less than 5 seconds after removal of the flame.

Globar (ASTM D-757) laminates of 1/8" thickness were prepared and catalyzed as above. The Barcol hardness of these laminates was 50 and the average burning rate was 0.07 inch/min.

EXAMPLE 20

1119 grams of diethylene glycol (10.5 mols) and 258 grams of glyceryl alpha allyl ether (1.95 mols) were reacted with 921 grams of tetrahydrophthalic anhydride (6.06 mols) and 702 grams of fumaric acid (6.06 mols) in a reaction vessel equipped with inert gas inlet, stirrer, thermometer and distilling column. After 6 hours at temperatures of 160° C. to 205° C. a clear light colored polyester was obtained having an acid value of 35 and a viscosity at 25° C., of 3.7 stokes in 35% styrene. 300 grams of the polyester thus prepared were readily dissolved in 300 grams of methylene chloride. 140 grams of bromine, equivalent to 97.5% of theoretical amount, based on the combined tetrahydrophthalic anhydride and glyceryl alpha allyl ether present were added to this solution over a 45 minute interval, at temperatures of 15 to 25° C.

After removal of methylene chloride by distillation, at batch temperatures from 50 to 165° C., a light colored, clear polyester was obtained which contained 31.8% bromine.

Infrared analysis of polyester samples taken at various stages during the bromination reaction indicated that the rate of disappearance of the allyl unsaturation and that of the tetrahydrophthalic unsaturation are approximately equal while the alpha,beta ethylenic unsaturation derived from the fumaric acid was not disturbed.

We claim:
1. A halogenated polyester comprising the reaction product of (1) a halogen selected from the group consisting of chlorine, bromine and mixtures thereof with (2) a polyester which is the product of the reaction of at least one alpha, beta-ethylenically unsaturated dicarboxylic acid or anhydride containing up to about 20 carbon atoms per molecule and at least one compound containing aliphatic unsaturation having a halogenation rate faster than that of the alpha, beta-ethylenically unsaturated dicarboxylic acid or anhydride selected from the group consisting of (A) polyhydric alcohols having about 2 to 24 carbon atoms containing active unsaturation which is subject to subsequent halogenation and (B) a mixture of at least one polyhydric alcohol having about 2 to 24 carbon atoms and at least one ethylenically unsaturated dicarboxylic acid or anhydride containing up to about 20 carbon atoms free of any alpha, beta-ethylenic unsaturation other than aromatic unsaturation; substantially all of the alpha, beta-ethylenic unsaturation remaining unreacted with the halogen and available for subsequent polymerization with a cross-linking agent; the alpha, beta-ethylenically unsaturated dicarboxylic acid or anhydride comprising about 15 to 67 mol percent of the polyester; the halogen comprising about 10 to 50 percent by weight of the halogenated polyester.

2. The halogenated polyester of claim 1 wherein the compound containing aliphatic unsaturation having a halogenation rate faster than that of the alpha, beta-ethylenically unsaturated dicarboxylic acid or anhydride is a polyhydric alcohol containing about 2 to 24 carbon atoms.

3. A cross-linked halogenated polyester which is the reaction product of (1) the halogenated polyester of claim 1; and (2) approximately 20% to 60% by weight based on the weight of the polyester of a polymerizable ethylenically unsaturated monomer containing a $CH_2\!\!=\!\!C\!\!<$ group.

4. A halogenated fire-retardant polyester comprising the reaction product of (1) a polyester which is the product of the reaction of (a) an alpha, beta-ethylenic unsaturated dicarboxylic acid or anhydride containing up to about 20 carbon atoms per molecule; (b) an ethylenically unsaturated dicarboxylic acid or anhydride containing up to about 20 carbon atoms per molecule free of any alpha, beta-ethylenic unsaturation other than aromatic unsaturation other than aromatic unsaturation and (c) a polyhydric alcohol containing about 2 to 24 carbon atoms; and (2) a halogen selected from the group consisting of chlorine and bromine; substantially all of the alpha, beta-ethylenic unsaturation remaining unreacted with the halogen; the amount of (a) comprising about 15 to about 67 mol percent of the polyester; the amount of (b) being sufficient to result in a halogenated polyester having a halogen content of about 10% to 50% by weight of the halogenated polyester; the amount of (c) being about 100 to 125% of the amount theoretically necessary to react with all of the carboxylic groups present; the amount of halogen being approximately that theoretically required to react with the non-alpha, beta ethylenic unsaturation of (b).

5. The halogenated fire-retardant polyester of claim 4 wherein the alpha, beta-ethylenic unsaturated dicarboxylic acid or anhydride is selected from the group consisting of maleic acid or anhydride and fumaric acid.

6. The halogenated fire-retardant polyester of claim 4 wherein the ethylenically unsaturated dicarboxylic acid or anhydride free of any alpha, beta ethylenic unsaturation other than aromatic unsaturation is tetrahydrophthalic acid or anhydride.

7. The method of preparing a halogenated polyester composition which comprises the steps of:
(1) mixing at least one alpha, beta-ethylenically unsaturated dicarboxylic acid or anhydride containing up to about 20 carbon atoms and at least one compound containing aliphatic unsaturation having a halogenation rate faster than that of the alpha, beta-ethylenically unsaturated dicarboxylic acid or anhydride, said compound being selected from the group consisting of (A) polyhydric alcohols having about 2 to 24 carbon atoms containing active unsaturation which is subject to subsequent halogenation and (B) a mixture of at least one polyhydric alcohol having about 2 to 24 carbon atoms and at least one ethylenically unsaturated dicarboxylic acid or anhydride containing up to about 20 carbon atoms free of any alpha, beta-ethylenic unsaturation other than aromatic unsaturation, the alpha, beta-ethylenically unsaturated dicarboxylic acid or anhydride comprising about 15 to 67 mol percent of the mixture;
(2) heating the mixture to a temperature in the range of 150° to 250° until esterification is complete;
(3) recovering the polyester thus produced;
(4) dissolving the polyester in a solvent which is not readily susceptible to halogenation;
(5) introducing a halogen selected from the group consisting of chlorine and bromine in an amount approximately equal to that theoretically required to react with the said aliphatic unsaturation and sufficient to produce a halogenated polyester containing approximately 10 percent to 60 percent by weight of halogen;
(6) maintaining the reaction mixture at a temperature in the range of about −50° C. to about 50° C. until the desired degree of addition of halogen to the aliphatic unsaturation of the polyester is achieved; substantially all of the alpha, beta-ethylenic unsaturation remaining unreacted with the halogen;
(7) removing the solvent at a temperature below 180° C.; and (8) recovering the desired halogenated polyester composition.

8. The method of claim 7 wherein the amount of polyhydric alcohol is between an amount sufficient to react theoretically with all of the carboxyl groups present and 125 percent of such theoretical amount.

9. The method of claim 7 wherein the halogen is bromine.

10. The method of preparing a cross-linked halogenated polyester which comprises the steps of:
(1) preparing a halogenated polyester composition by the method of claim 7;
(2) mixing said halogenated polyester with approximately 20% to 60% by weight based on the weight of the polyester of an ethylenically unsaturated monomer having a $CH_2=C<$ group and being capable of copolymerization with the alpha, beta-ethylenic unsaturation present in the polyester; and
(3) polymerizing the mixture.

11. The method of claim 10 wherein the ethylenically unsaturated monomer is styrene.

References Cited

UNITED STATES PATENTS

| 3,151,183 | 9/1964 | Bill et al. | 260—869 |
| 3,196,190 | 7/1965 | Nischk et al. | 260—869 |
| 2,829,070 | 4/1958 | Osborn | 117—93 |
| 3,004,003 | 10/1961 | Batzer | 260—861 |
| 3,333,022 | 7/1967 | Reiners et al. | 260—869 |

FOREIGN PATENTS

| 842,958 | 9/1958 | Great Britain. |

OTHER REFERENCES

Batzer et al., Diels-Alder Synthesis of Unsaturated Polyesters, Die Makrumole Kulare Chemie, vol. 44–47, 1961, pp. 179, 188, 192.

WILLIAM SHORT, Primary Examiner

MELVIN GOLDSTEIN, Assistant Examiner

U.S. Cl. X.R.

117—124; 161—195; 260—2.5, 75, 76, 77, 863